United States Patent
Tai et al.

(10) Patent No.: US 9,182,529 B2
(45) Date of Patent: Nov. 10, 2015

(54) LIGHT GUIDE ELEMENT AND LAMP FOR CONTROLLING LIGHT BEAM ANGLE

(71) Applicant: Radiant Opto-Electronics Corporation, Kaohsiung (TW)

(72) Inventors: Yung-Hui Tai, Kaohsiung (TW); Wei-Hsuan Chen, Kaohsiung (TW); Chun-Hau Lai, Kaohsiung (TW)

(73) Assignee: RADIANT OPTO-ELECTRONICS CORPORATION, Kaohsiung (TW)

(*) Notice: Subject to any disclaimer, the term of this patent is extended or adjusted under 35 U.S.C. 154(b) by 93 days.

(21) Appl. No.: 14/078,495

(22) Filed: Nov. 12, 2013

(65) Prior Publication Data
US 2015/0023027 A1 Jan. 22, 2015

(30) Foreign Application Priority Data
Jul. 22, 2013 (TW) .............................. 102126137 A

(51) Int. Cl.
F21V 8/00 (2006.01)
F21V 7/00 (2006.01)
F21K 99/00 (2010.01)

(52) U.S. Cl.
CPC ................. G02B 6/0001 (2013.01); *F21K 9/52* (2013.01); *F21V 7/005* (2013.01)

(58) Field of Classification Search
CPC .... G02B 6/0001; G02B 6/0018; F21V 17/00; F21V 3/04; F21V 5/02; F21V 7/005; F21W 2121/00; F21K 9/00; F21S 8/04
USPC ................. 362/297, 311.01–311.15, 314–361
See application file for complete search history.

(56) References Cited

U.S. PATENT DOCUMENTS

| | | | | |
|---|---|---|---|---|
| 5,592,578 | A * | 1/1997 | Ruh | 385/31 |
| 7,123,419 | B1 | 10/2006 | Simon | |
| 7,306,351 | B2 * | 12/2007 | Chao et al. | 362/327 |
| 7,431,480 | B2 * | 10/2008 | Godo | F21V 5/04 |
| | | | | 362/311.06 |
| 8,201,983 | B2 * | 6/2012 | Wang et al. | 362/602 |
| 8,761,565 | B1 * | 6/2014 | Coleman et al. | 385/146 |
| 2010/0027257 | A1 * | 2/2010 | Boonekamp et al. | 362/235 |

(Continued)

FOREIGN PATENT DOCUMENTS

| | | |
|---|---|---|
| CN | 2505986 Y | 8/2002 |
| CN | 101561114 A | 10/2009 |

(Continued)

*Primary Examiner* — Evan Dzierzynski
*Assistant Examiner* — Christopher E Dunay
(74) *Attorney, Agent, or Firm* — CKC & Partners Co., Ltd.

(57) ABSTRACT

A light guide element and a lamp are described. The light guide element has a length and an angle of total reflection. The light guide element includes a light-incident surface, a light-emitting surface, a first reflecting surface, and a second reflecting surface. The light-incident surface includes a first outer peripheral edge and a first inner peripheral edge. The light-emitting surface includes a second outer peripheral edge and a second inner peripheral edge. The first reflecting surface connects the first outer peripheral edge and the second outer peripheral edge. The second reflecting surface connects the first inner peripheral edge and the second inner peripheral edge. An angle is formed between the first reflecting surface and the second reflecting surface. The angle is smaller than the angle of total reflection, and the length is greater than a predetermined distance divided by tan the angle of total reflection).

18 Claims, 8 Drawing Sheets

(56) References Cited

U.S. PATENT DOCUMENTS

| | | | |
|---|---|---|---|
| 2011/0216543 A1* | 9/2011 | Kayanuma | G02B 3/08 362/311.01 |
| 2011/0234076 A1* | 9/2011 | Simon et al. | 313/46 |
| 2013/0155719 A1 | 6/2013 | Brott et al. | |
| 2014/0153223 A1* | 6/2014 | Lin | 362/97.3 |
| 2014/0204587 A1* | 7/2014 | Hukkanen | G02B 3/08 362/308 |
| 2014/0340927 A1* | 11/2014 | Johnston et al. | 362/555 |
| 2014/0362588 A1* | 12/2014 | Wu et al. | 362/327 |

FOREIGN PATENT DOCUMENTS

| | | |
|---|---|---|
| CN | 202955628 U | 5/2013 |
| TW | 201027129 A | 7/2010 |
| TW | M393645 U1 | 12/2010 |

\* cited by examiner

LIGHT GUIDE ELEMENT AND LAMP FOR CONTROLLING LIGHT BEAM ANGLE

RELATED APPLICATIONS

This application claims priority to Taiwan Application Serial Number 102,126,137, filed Jul. 22, 2013, which is herein incorporated by reference.

BACKGROUND

1. Field of Invention

The present invention relates to a light guide element, and more particularly to a light guide element and a lamp for controlling a light beam angle.

2. Description of Related Art

A conventional lamp consists essentially of a bulb and a reflecting mask. The reflecting mask mainly functions to reflect light and change a light field generated from the bulb. In general, a surface of the reflecting mask is coated with a highly reflective film to achieve the reflection efficacy. However, such method of coating the film on the surface of the reflecting mask to change the light field has limited diversities and higher cost, and thus applications thereof are limited.

Another conventional lamp can change a light shape generated from a light source by collaborating with a secondary optical element. However, in this structure, a recess has to be disposed in a center of the secondary optical element to receive the light source for achieving the object of light shape adjustment. Thus, the secondary optical element has to match with different types or quantities of light sources to change the whole structure design, thus resulting in cost increase.

Hence, a light guide element is needed to overcome the foregoing problems.

SUMMARY

One aspect of the present invention is to provide a light guide element and a lamp for controlling a light beam angle by using a total reflection characteristic of a light beam to change a travel direction of the light beam in the light guide element, thereby achieving an object of adjusting the light beam angle emitted from the light guide element. Therefore, applications of the light guide element may meet irradiation requirements of various light beam angles, and also reduce power consumption.

Another aspect of the present invention is to provide a light guide element and a lamp for controlling a light beam angle by adjusting a angle and a length of the light guide element, in which the angle is formed between an extension line of a first reflecting surface and an extension line of a second reflecting surface, thereby adjusting a travel direction of a light beam in the light guide element to achieve an object of adjusting the light beam angle emitted from the light guide element.

According to the aforementioned aspects, the present invention provides a light guide element for controlling a light beam angle. The light guide element is suitable for guiding at least one light beam, in which the at least one light beam can be totally reflected in the light guide element to generate a predetermined light beam angle. The light guide element is an annular frustum and has a length and an angle of total reflection. The light guide element includes a light-incident surface, a light-emitting surface, a first reflecting surface and a second reflecting surface. The light-incident surface has a first outer peripheral edge and a first inner peripheral edge. There is a distance between the first outer peripheral edge and the first inner peripheral edge. The light-emitting surface is opposite to the light-incident surface, and an area of the light-emitting surface is greater than an area of the light-incident surface. The light-emitting surface includes a second outer peripheral edge and a second inner peripheral edge. The first reflecting surface connects the first outer peripheral edge and the second outer peripheral edge. The second reflecting surface connects the first inner peripheral edge and the second inner peripheral edge, in which an angle is formed between an extension line of the first reflecting surface and an extension line of the second reflecting surface, and the angle is smaller than the angle of total reflection, and the length of the light guide element is greater than a predetermined distance divided by tan (the angle of total reflection), in which the predetermined distance is determined by the position where the at least one light beam enters the light guide element from the light-incident surface.

According to an embodiment of the present invention, the predetermined distance is half the distance between the first outer peripheral edge and the first inner peripheral edge.

According to an embodiment of the present invention, the light guide element is a polymethyl methacrylate light guide element, in which the angle of total reflection is 42.16 degrees.

According to an embodiment of the present invention, the light guide element is a polycarbonate light guide element, in which the angle of total reflection is 38.97 degrees.

According to an embodiment of the present invention, the light-emitting surface is a rough surface, a matte surface or a mesh surface.

According to an embodiment of the present invention, the light-emitting surface is an inclined plane or a cambered plane.

According to an embodiment of the present invention, the first reflecting surface is parallel to a central line of the light guide element, and the second reflecting surface is inclined to the central line.

According to an embodiment of the present invention, the second reflecting surface is parallel to a central line of the light guide element, and the first reflecting surface is inclined to the central line.

According to an embodiment of the present invention, the first reflecting surface and the second reflecting surface are inclined to a central line of the light guide element.

According to the aforementioned aspects, the present invention provides a lamp. The lamp includes a light guide element and a light source. The light guide element is an annular frustum and has a length and an angle of total reflection. The light guide element includes a light-incident surface, a light-emitting surface, a first reflecting surface and a second reflecting surface. The light-incident surface has a first outer peripheral edge and a first inner peripheral edge. There is a distance between the first outer peripheral edge and the first inner peripheral edge. The light-emitting surface is opposite to the light-incident surface, and an area of the light-emitting surface is greater than an area of the light-incident surface. The light-emitting surface includes a second outer peripheral edge and a second inner peripheral edge. The first reflecting surface connects the first outer peripheral edge and the second outer peripheral edge. The second reflecting surface connects the first inner peripheral edge and the second inner peripheral edge, in which an angle is formed between an extension line of the first reflecting surface and an extension line of the second reflecting surface. A light generated from the light source enters the light guide element from the light-incident surface and emits out of the light-emitting surface to generate a predetermined light beam angle of the light, in which a horizontal distance between the light source and the first outer peripheral edge is a predetermined distance. The predetermined distance is determined by the position where the at least one light beam enters the light guide element from the light-incident surface. The angle between an extension line of the first reflecting surface and an extension line of the second reflecting surface is smaller than the angle of total reflection, and the length of the light guide element is greater than the predetermined distance divided by tan (the angle of total reflection).

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
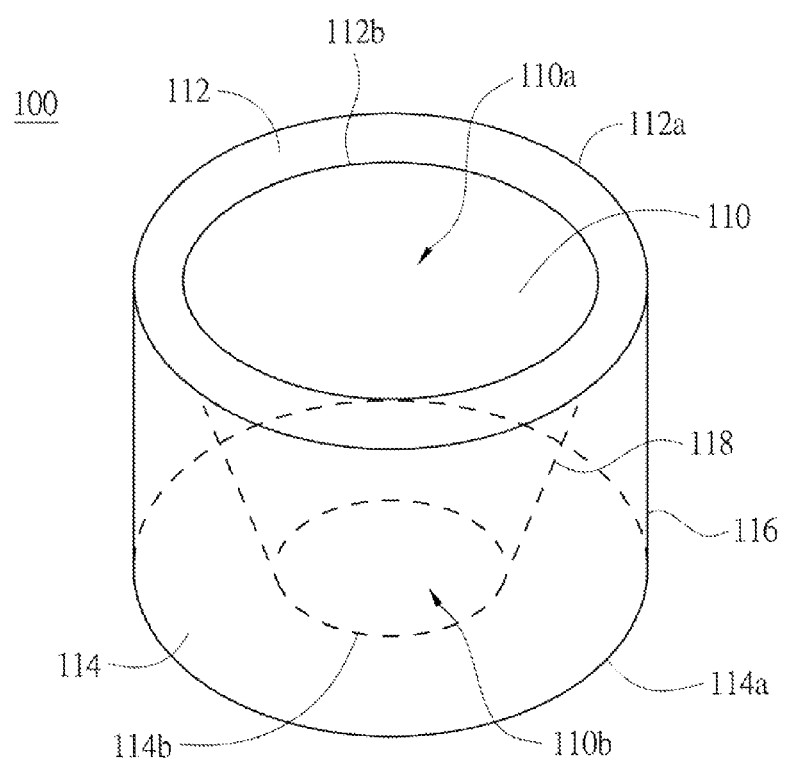
FIG. 1A is a schematic structural diagram showing a light guide element in accordance with a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 1B:
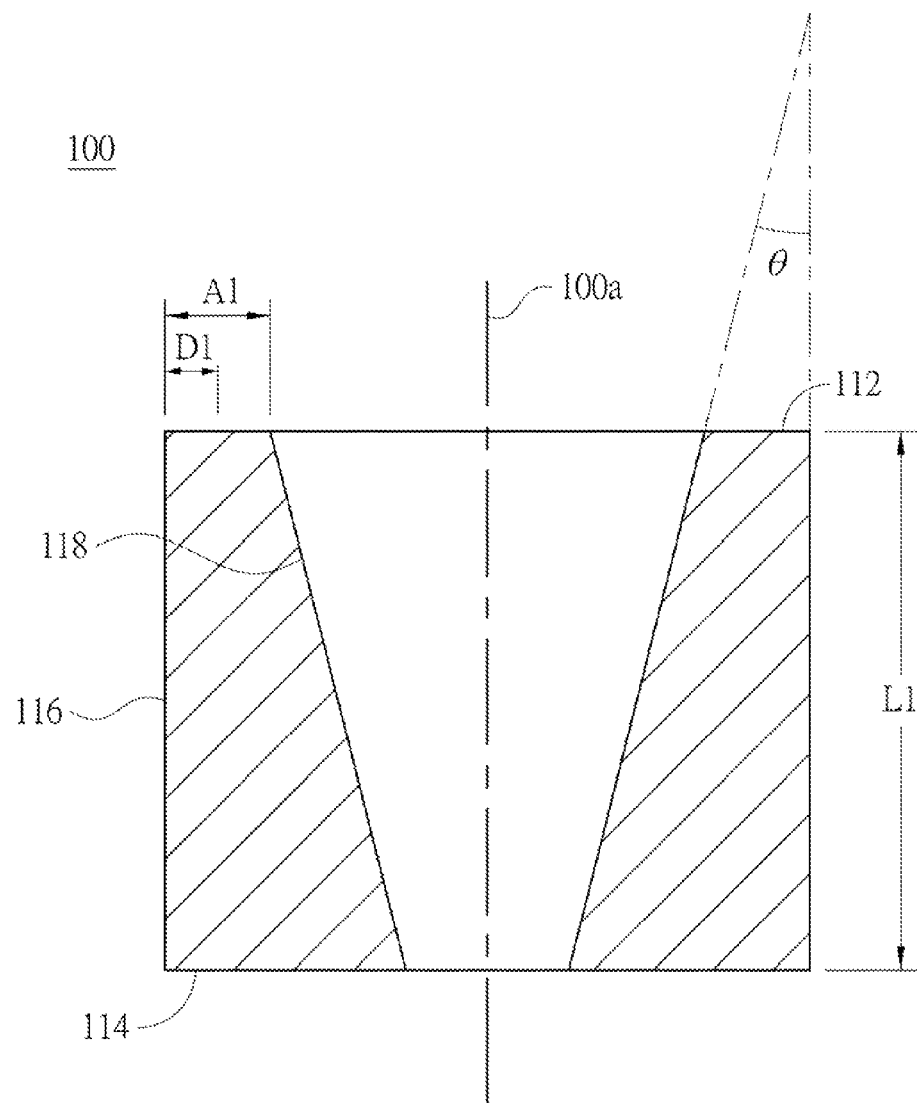
FIG. 1B is a schematic cross-sectional view of the, light guide element in accordance with the first embodiment of the present invention.

Referring to FIGS. 1A and 1B, FIG. 1A is a schematic structural diagram showing a light guide element 100 in accordance with a first embodiment of the present invention, and FIG. 1B is a schematic cross-sectional view of the light guide element 100 in accordance with the first embodiment of the present invention. In the present embodiment, the light guide element 100 is suitable for use in guiding a light beam to be totally reflected in the light guide element 100, so as to generate different light beam angles. In the present embodiment, the light beam may come from a light source, such as a light emitting diode (LED). The light guide element 100 is an annular frustum having a through hole 110.

The light guide element 100 has a length L1 and an angle $\theta_T$ of total to reflection. The length means a vertical height which is parallel to a central line 100a of the light guide element 100.

The light guide element 100 includes a light-incident surface 112, a light-emitting surface 114, a first reflecting surface 116 and a second reflecting surface 118. The through hole 110 forms a first opening 110a on the light-incident surface 112, and the light-incident surface 112 has a first outer peripheral edge 112a and a first inner peripheral edge 112b. There is a distance A1 between the first outer peripheral edge 112a and the first inner peripheral edge 112b. The light-emitting surface 114 is opposite to the light-incident surface 112, and an area of the light-emitting surface 114 is greater than an area of the light-incident surface 112. The through hole 110 forms a second opening 110b on the light-emitting surface 114, and the light-emitting surface 114 has a second outer peripheral edge 114a and a second inner peripheral edge 114b.

The first reflecting surface 116 connects the first outer peripheral edge 112a and the second outer peripheral edge 114a. The second reflecting surface 118 connects the first inner peripheral edge 112b and the second inner peripheral edge 114b. After entering the light guide element 110 from the light-incident surface 112, the light beam is totally reflected by the first reflecting surface 116 and the second reflecting surface 118 and then is emitted from the light-emitting surface 114. An angle θ is formed between an extension line of the first reflecting surface 116 and an extension line of the second reflecting surface 118. To achieve an object of adjusting the light beam angle, in one embodiment of the present invention, the angle θ is defined to be smaller than the angle $\theta_T$ of total reflection, and the length L1 is defined to be greater than a predetermined distance D1 divided by tan (the angle $\theta_T$ of total reflection). The predetermined distance D1 is determined by the position where the at least one light beam enters the light guide element 100 from the light-incident surface 112, i.e., the position is the location where the light source is disposed at the light-incident surface 112, thus it will be defined as a horizontal distance from a location of the light source to the first outer peripheral edge 112a. In one embodiment, the light-emitting surface 114 is a rough surface, a matte surface or a mesh surface, so as to guide the light beam to be emitted out.

In one embodiment, the angle $\theta_T$ of total reflection may be different according to the material of the light guide element 100. When the light guide element 100 is a polymethyl methacrylate light guide element, the angle $\theta_T$ of total reflection is 42.16 degrees. When the light guide element 100 is a polycarbonate light guide element, the angle $\theta_T$ of total reflection is 38.97 degrees. Referring to Table 1 below, Table 1 shows light beam angles obtained by respectively using polymethyl methacrylate and polycarbonate as the material of the light guide element 100 and adjusting the values of the length L1 and the angle θ. A beam angle of the light beam emitted from the light source used in Table 1 is 120 degrees. In the present embodiment, the light source is disposed in the middle of the distance A1. Therefore, the predetermined distance D1 is half the distance. A1, i.e. (distance A1)/2. In other words, the light source is disposed in the middle between the first outer peripheral edge 112a and the first inner peripheral edge 112b. It is noted that the location of the light source can be adjusted to meet actual requirements.

TABLE 1 measurement data of the light guide elements formed from different materials

| material | polymethyl methacrylate | polycarbonate |
| --- | --- | --- |
| character of the material | refractive index n = 1.49<br>angle $\theta_T$ of total reflection = 42.16° | refractive index n = 1.59<br>angle $\theta_T$ of total reflection = 38.97° |

TABLE 1-continued measurement data of the light guide elements formed from different materials

| distance A1 | 3.5 mm | | | | 3.5 mm | | | |
|---|---|---|---|---|---|---|---|---|
| $((A1)/2)/\tan\theta_T$ | 1.93 mm | | | | 2.16 mm | | | |
| length L1 | 30 mm | 30 mm | 1.9 mm | 1.9 mm | 30 mm | 30 mm | 1.9 mm | 1.9 mm |
| angle θ | 18° | 43° | 18° | 43° | 18° | 43° | 18° | 43° |
| light beam angle | 60° | 120° | 120° | 120° | 70° | 120° | 120° | 120° |

As shown in Table 1, when the material of the light guide element 100 is polymethyl methacrylate, the angle θ is smaller than the angle $\theta_T$ of total reflection and the length L1 is greater than $((\text{distance A1})/2)/\tan\theta_T$, and the beam angle of the light beam emitted from the light guide element 100 is about 60 degrees, thereby achieving an object of decreasing the light beam angle. When the material of the light guide element 100 is polycarbonate, the angle θ is smaller than the angle $\theta_T$ of total reflection and the length L1 is greater than $((\text{distance A1})/2)/\tan\theta_T$, and the beam angle of the light beam emitted from the light guide element 100 is about 70 degrees, thereby achieving the same object of decreasing the light beam angle. Simultaneously, Table 1 also shows that, whether the light guide element 100 is formed from polymethyl methacrylate or polycarbonate, as long as the length L1 is smaller than $((\text{distance A1})/2)/\tan\theta_T$ or the angle θ is greater than the angle $\theta_T$ of total reflection, the beam angle of the light beam emitted from the light guide element 100 is still 120 degrees. In other words, the beam angle of the light beam can be adjusted by defining the length L1 of the light guide element 100 to be smaller than the angle $\theta_T$ of total reflection and the angle θ to be greater than $((\text{distance A1})/2)/\tan\theta_T$.

It is noted that the data in Table 1 is obtained using the light guide element 100 in FIG. 1B. The light guide element 100 shown in FIG. 1B is an embodiment in which first reflecting surface 116 parallel to the central line 100a of the light guide element 100, and the second reflecting surface 118 is inclined to the central line 100a. However, embodiments of the present invention are not limited thereto. Also, the location of the light source is not limited to the middle of the distance A1.

Figure 2:
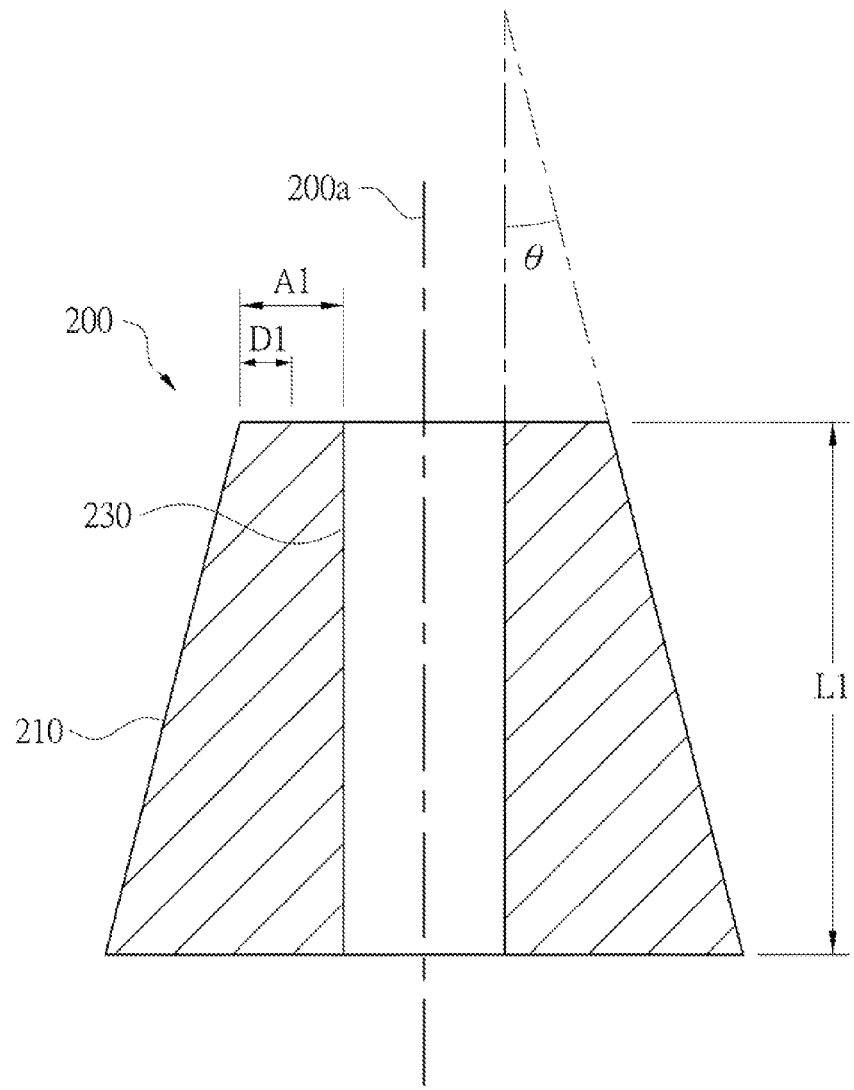
FIG. 2 is a schematic cross-sectional view of a light guide element in accordance with a second embodiment of the present invention.

Referring to FIG. 2, FIG. 2 is a schematic cross-sectional view of a light guide element 200 in accordance with a second embodiment of the present invention. The light guide element 200 shown in FIG. 2 has a first reflecting surface 210 and a second reflecting surface 230. The second reflecting surface 230 is parallel to a central line 200a of the light guide element 200, and the first reflecting surface 210 is inclined to the central line 200a. Referring to Table 2 simultaneously, Table 2 shows light beam angles obtained by respectively using polymethyl methacrylate and polycarbonate as the material of the light guide element 200 and adjusting the values of the length L1 and the angle θ. A beam angle of the light beam emitted from the light source used in Table 2 is 120 degrees. In the present embodiment, the light source is disposed in the middle of the distance A1. Therefore, the predetermined distance D1 is half the distance A1, i.e. (distance A1)/2. It is noted that the location of the light source may be adjusted to meet actual requirements.

TABLE 2 measurement data of the light guide elements formed from different materials

| material | polymethyl methacrylate | | | | polycarbonate | | | |
|---|---|---|---|---|---|---|---|---|
| character of the material | refractive index n = 1.49 angle $\theta_T$ of total reflection = 42.16° | | | | refractive index n = 1.59 angle $\theta_T$ of total reflection = 38.97° | | | |
| distance A1 | 3.5 mm | | | | 3.5 mm | | | |
| $((A1)/2)/\tan\theta_T$ | 1.93 mm | | | | 2.16 mm | | | |
| length L1 | 30 mm | 30 mm | 1.9 mm | 1.9 mm | 30 mm | 30 mm | 1.9 mm | 1.9 mm |
| angle θ | 18° | 43° | 18° | 43° | 18° | 43° | 18° | 43° |
| light beam angle | 60° | 120° | 120° | 120° | 70° | 120° | 120° | 120° |

As shown in Table 2, when the material of the light guide element 200 is polymethyl methacrylate, the angle θ is smaller than the angle $\theta_T$ of total reflection and the length L1 is greater than $((\text{distance A1})/2)/\tan\theta_T$, and the beam angle of the light beam emitted from the light guide element 200 is about 60 degrees, thereby achieving an object of decreasing the light beam angle. When the material of the light guide element 200 is polycarbonate, the angle θ is smaller than the angle $\theta_T$ of total reflection and the length L1 is greater than $((\text{distance A1})/2)/\tan\theta_T$, and the beam angle of the light beam emitted from the light guide element 200 is about 70 degrees, thereby achieving the same object of decreasing the light beam angle. Simultaneously, Table 2 also shows that, whether the light guide element 200 is formed from polymethyl methacrylate or polycarbonate, as long as the length L1 is smaller than $((\text{distance A1})/2)/\tan\theta_T$ or the angle θ is greater than the angle $\theta_T$ of total reflection, the beam angle of the light beam emitted from the light guide element 200 is still 120 degrees. In other words, the beam angle of the light beam can be adjusted by defining the length L1 of the light guide element 200 to be smaller than the angle $\theta_T$ of total reflection and the angle θ to be greater than $((\text{distance A1})/2)/\tan\theta_T$.

Figure 3A:
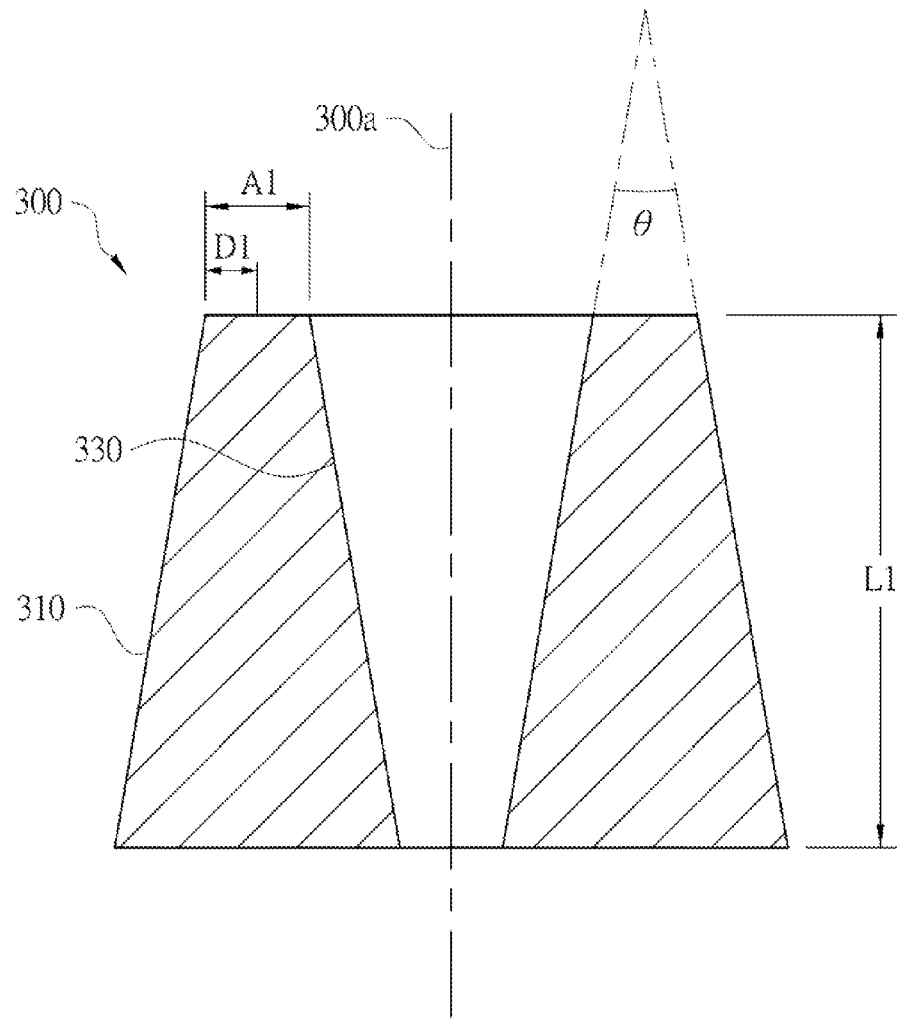
FIG. 3A is a schematic cross-sectional view of a light guide element accordance with a third embodiment of the present invention.

Referring to FIG. 3A, FIG. 3A is a schematic cross-sectional view of a light guide element 300 in accordance with a third embodiment of the present invention. The light guide element 300 shown in FIG. 3A has a first reflecting surface 310 and a second reflecting surface 330. The first reflecting surface 310 and the second reflecting surface 330 are inclined to a central line 300a of the light guide element 300. Referring to Table 3 simultaneously, Table 3 shows light beam angles obtained by respectively using polymethyl methacrylate and polycarbonate as the material of the light guide element 300 and adjusting values of the length L1 and the angle θ. A beam angle of the light beam emitted from the light source used in Table 3 is 120 degrees. In the present embodiment, the light source is disposed in the middle of the distance A1. Therefore, the predetermined distance D1 is half the distance A1, i.e. (distance A1)/2. It is noted that the location of the light source may be adjusted to meet actual requirements.

TABLE 3 measurement data of the light guide elements formed from different materials

| material | polymethyl methacrylate | | | | polycarbonate | | | |
|---|---|---|---|---|---|---|---|---|
| character of the material | refractive index n = 1.49 | | | | refractive index n = 1.59 | | | |
| | angle $\theta_T$ of total reflection = 42.16° | | | | angle $\theta_T$ of total reflection = 38.97° | | | |
| distance A1 | 3.5 mm | | | | 3.5 mm | | | |
| ((A1)/2)/tan$\theta_T$ | 1.93 mm | | | | 2.16 mm | | | |
| length L1 | 30 mm | 30 mm | 1.9 mm | 1.9 mm | 30 mm | 30 mm | 1.9 mm | 1.9 mm |
| angle θ | 18° | 43° | 18° | 43° | 18° | 43° | 18° | 43° |
| light beam angle | 45° | 90° | 120° | 120° | 50° | 93° | 120° | 120° |

As shown in Table 3, when the material of the light guide element 300 is polymethyl methacrylate, the angle θ is smaller than the angle $\theta_T$ of total reflection and the length L1 is greater than ((distance A1)/2)/tan $\theta_T$, and the beam angle of the light beam emitted from the light guide element 300 is about 45 degrees, thereby achieving an object of decreasing the light beam angle. When the material of the light guide element 300 is polycarbonate, the angle θ is smaller than the angle $\theta_T$ of total reflection and the length L1 is greater than ((distance A1)/2)/tan $\theta_T$, and the beam angle of the light beam emitted from the light guide element 300 is about 50 degrees, thereby achieving the same object of decreasing the light beam angle. Simultaneously, Table 3 also shows that, whether the light guide element 300 is formed from polymethyl methacrylate or polycarbonate, as long as the length L1 is smaller than ((distance A1)/2)/tan $\theta_T$ or the angle θ is greater than the angle $\theta_T$ of total reflection, the beam angle of the light beam emitted from the light guide element 300 is still 120 degrees. In other words, the beam angle of the light beam can be adjusted by defining the length L1 of the light guide element 300 to be smaller than the angle $\theta_T$ of total reflection and the angle θ to be greater than ((distance A1)/2)/tan $\theta_T$.

Figure 3B:
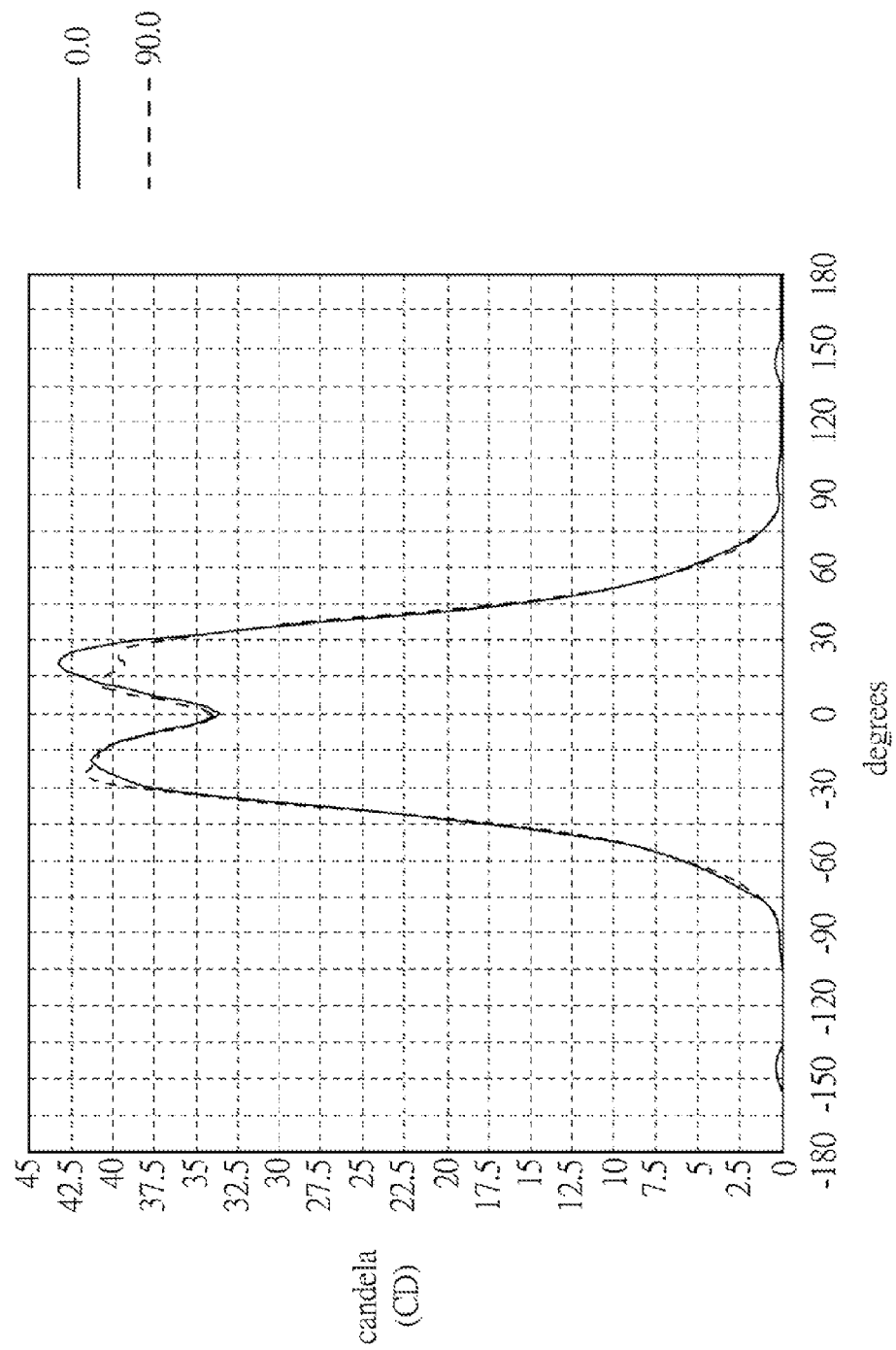
FIG. 3B is a polar candela distribution plot of a polymethyl methacrylate light guide element in accordance with the third embodiment of the present invention.
Figure 3C:
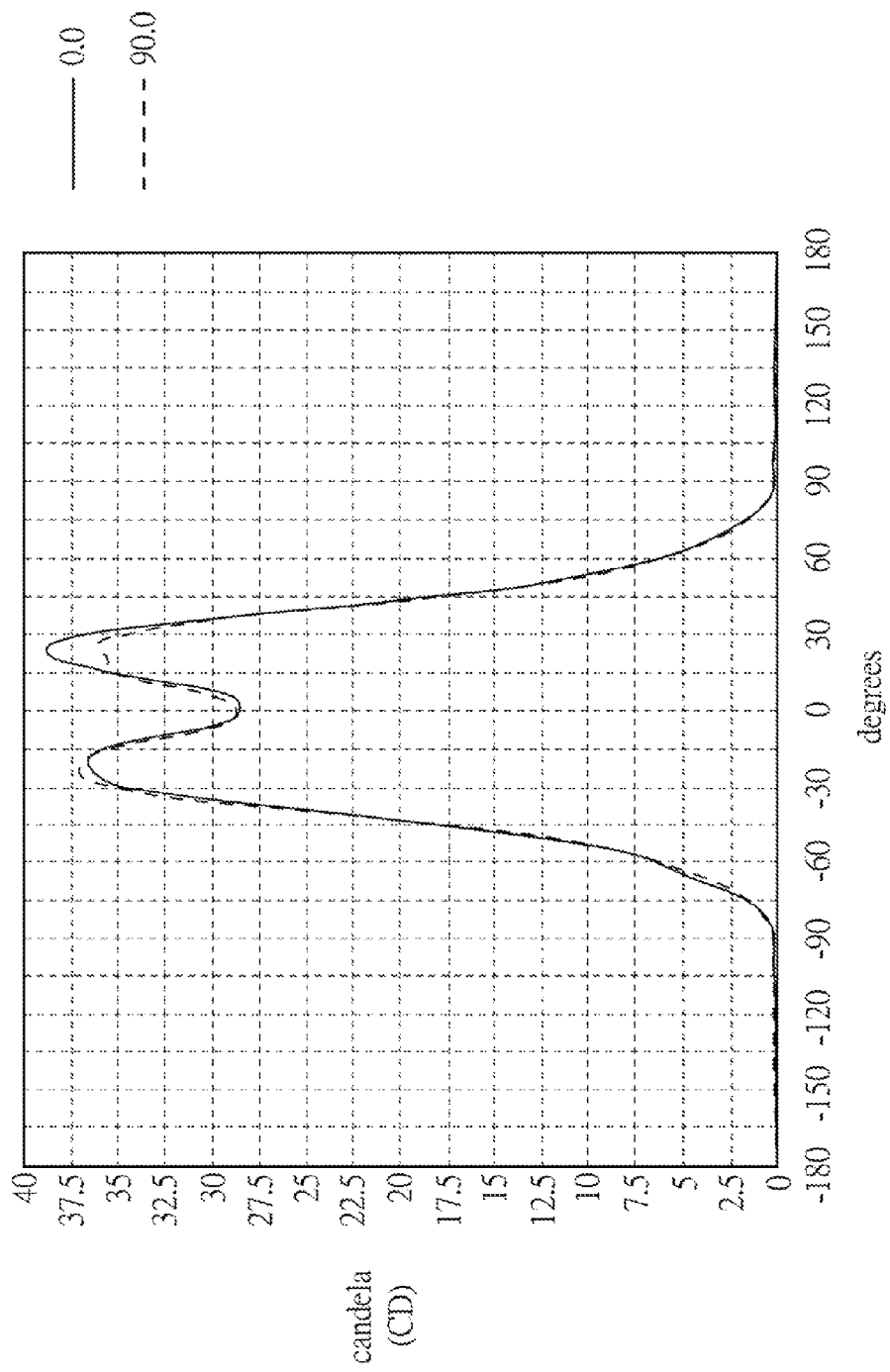
FIG. 3C is a polar candela distribution plot of a polycarbonate light guide element in accordance with the third embodiment of the present invention.

Referring to FIG. 3B and FIG. 3C, FIG. 3B is a polar candela distribution plot of a polymethyl methacrylate light guide element in accordance with the third embodiment of the present invention, and FIG. 3C is a polar candela distribution plot of a polycarbonate light guide element in accordance with the third embodiment of the present invention. As shown in FIG. 3B, FIG. 3C and Table 3, when the length L1 is 30 mm which is greater than ((distance A1)/2)/tan $\theta_T$ and the angle θ is 43 degrees, the polymethyl methacrylate light guide element and the polycarbonate light guide element generate the beam angles of the light beam are 90 degrees and 93 degrees respectively. Although the object of reducing the light beam angle can be achieved, yet the light field at the center of the aforementioned light guide elements is dark, and thus the light guide elements do not meet general illumination and utilization requirements when being applied on lamps. Therefore, in order to achieve the goal of adjusting light beam angle of the light guide element 300 to meet the lamp market requirements of the lamps, in the present embodiment, the light guide element 300 may be defined by the conditions of the length L1 of the light guide element 300 smaller than the angle $\theta_T$ of total reflection; and the angle θ greater than ((distance A1)/2)/tan $\theta_T$.

To sum up, no matter how the locations of the first reflecting surface and the second reflecting surface relative to the central line are changed, the area of the light-incident surface is smaller than the area of the light-emitting surface. Meanwhile, the beam angle of the light beam can be adjusted by defining the length L1 of the light guide element to be smaller than the angle $\theta_T$ of total reflection and the angle θ to be greater than ((distance A1)/2)/tan $\theta_T$. In addition, in one embodiment, the light-emitting surface may be an inclined plane or a cambered plane so as to achieve different light-emitting effect.

Figure 4:
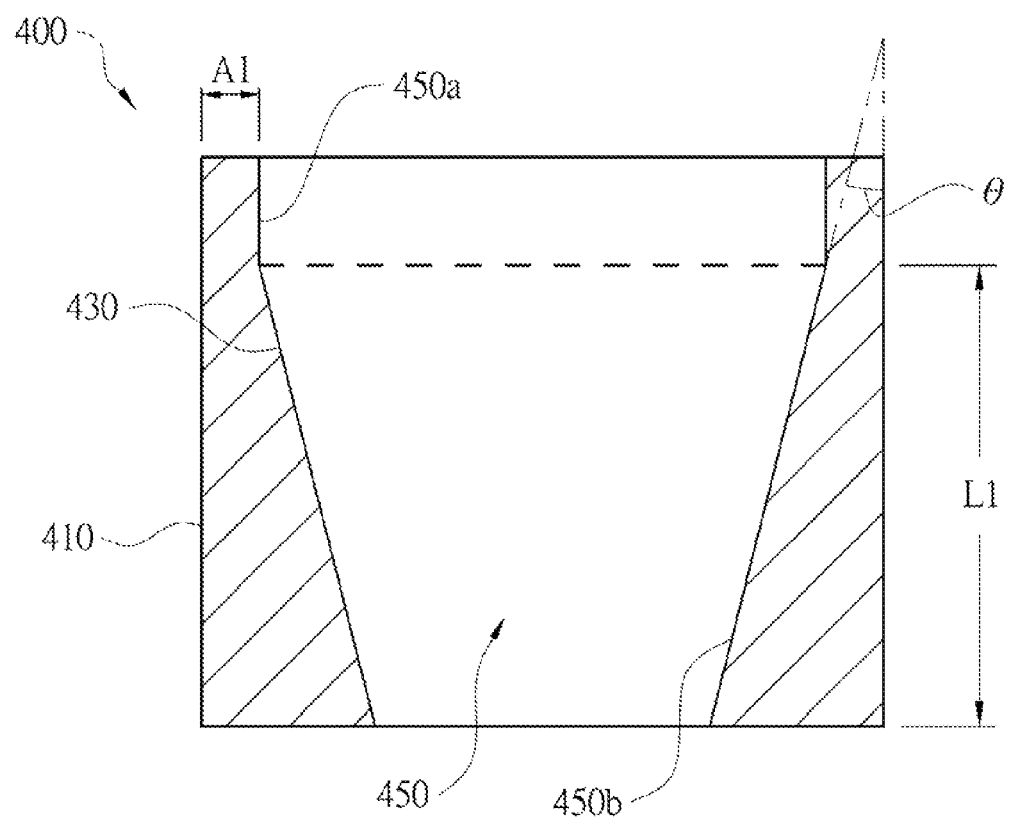
FIG. 4 is a schematic cross-sectional view of a light guide element in accordance with a fourth embodiment of the present invention.

Referring to FIG. 4, FIG. 4 is a schematic cross-sectional view of a light guide element 400 in accordance with a fourth embodiment of the present invention. In the present embodiment, the light guide element 400 is similar to the light guide elements of aforementioned embodiments. Similarly, the light guide element 400 also has a distance A1, a length L1, an angle $\theta_T$ of total reflection and a first reflecting surface 410 and a second reflecting surface 430. The light guide element 400 has a through hole 450. The junction between the through hole 450 and the light guide element 400 is composed of a vertical section 450a and an inclined section 450b. The second reflecting surface 430 is located on the inclined section 450b. The length L1 in the present embodiment is a vertical height of the inclined section 450b of the light guide element 400. In one embodiment, the vertical section 450a may be used for fixing a light source, but the present invention is not limited thereto. The condition definitions of the light guide element 400 are the same as the aforementioned light guide element, and will not be repeated herein.

Figure 5:
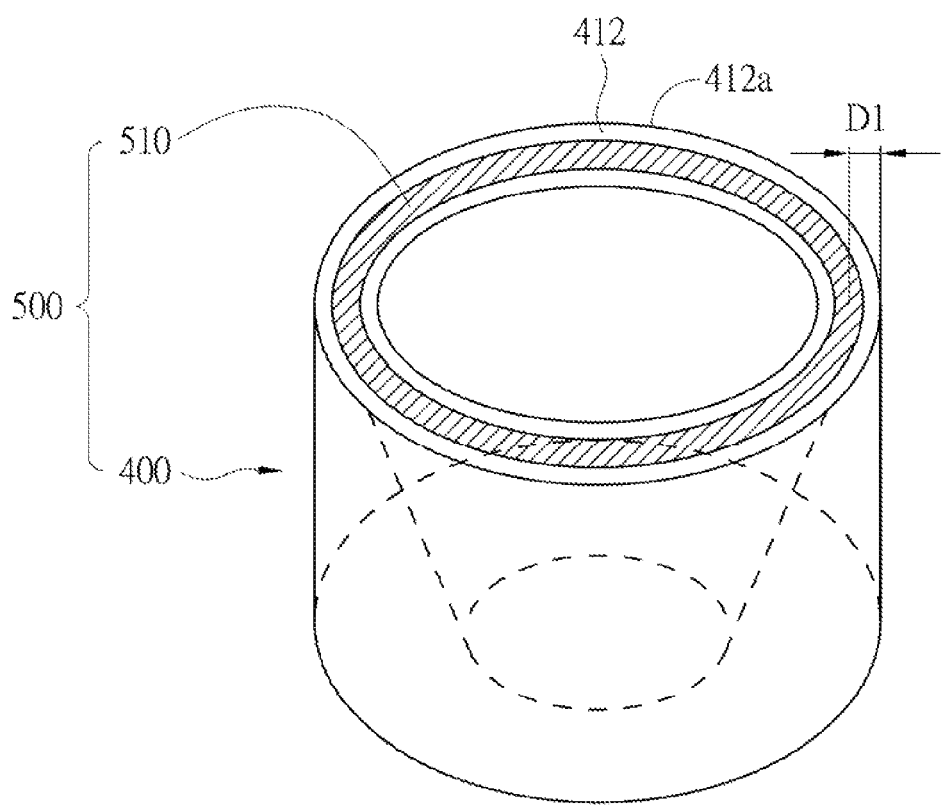
FIG. 5 is a schematic structural diagram showing a lamp in accordance with an embodiment of the present invention.

Referring to FIG. 5, FIG. 5 is a schematic structural diagram showing a lamp 500 in accordance with an embodiment of the present invention. In the present embodiment, the lamp 500 includes a light source 510 and the light guide element 400. It is noted that the light guide element 400 is merely used as an example for explanation in the present embodiment, and the light guide elements in other embodiments also may be collaborated with the light source 510. In addition, for matching the annular frustum light guide element, the light source 510 may be an annular LED, but the present invention is not limited thereto. As shown in FIG. 5, the light source 510 is disposed on a light-incident surface 412 of the light guide element 400. A horizontal distance from the light source 510 to a first outer peripheral edge 412a is a predetermined distance D1 which is determined by the position where the at least one light beam enters the light guide element 400 from the light-incident surface 412, i.e., the position is the location where the light source 510 is disposed at the light-incident surface 412, thus the predetermined distance D1 may vary with different locations of the light source 510. According to FIG. 5, the light source 510 is annular. Therefore, the at least one light beam generated from the light source 510 is assumed to be in ring-shaped Moreover, the center of the light source 510 or the center of ring-shaped light beam will be separated from the first outer peripheral edge 412a by the predetermined distance D1.

According to the aforementioned embodiments of the present invention, the present invention can adjust a travel direction of the light beam in the light guide element by adjusting the angle included between the extension line of the first reflecting surface and the extension line of the second reflecting surface, the length of the light guide element and a total reflection characteristic of the light beam, thereby achieving an object of adjusting the light beam angle emitted from the light guide element and meeting irradiation requirements of various light beam angles, and also reducing power consumption Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A light guide element having a length and an angle of total reflection, the light guide element comprising:
    a light-incident surface having a first outer peripheral edge and a first inner peripheral edge, there is a distance between the first outer peripheral edge and the first inner peripheral edge;
    a light-emitting surface which is opposite to the light-incident surface, wherein an area of the light-emitting surface is greater than an area of the light-incident surface, wherein the light-emitting surface includes a second outer peripheral edge and a second inner peripheral edge;
    a first reflecting surface connecting the first outer peripheral edge and the second outer peripheral edge; and
    a second reflecting surface connecting the first inner peripheral edge and the second inner peripheral edge, wherein an angle is formed between an extension line of the first reflecting surface and an extension line of the second reflecting surface;
    wherein the angle is smaller than the angle of total reflection, and the length of the light guide element is greater than a predetermined distance divided by tangent of the angle of total reflection;
    wherein the predetermined distance is determined by a distance between the first outer peripheral edge of the light-incident surface and where the at least one light beam enters the light guide element; and
    wherein the second reflecting surface extends from the first inner peripheral edge of the light-incident surface to the second inner peripheral edge of the light-emitting surface inwardly.

2. The light guide element of claim 1, wherein the predetermined distance is half the distance between the first outer peripheral edge and the first inner peripheral edge.

3. The light guide element of claim 1, wherein the light guide element is a polymethyl methacrylate light guide element, wherein the angle of total reflection is 42.16 degrees.

4. The light guide element of claim 1, wherein the light guide element is a polycarbonate light guide element, wherein the angle of total reflection is 38.97 degrees.

5. The light guide element of claim 1, wherein the light-emitting surface is a rough surface, a matte surface or a mesh surface.

6. The light guide element of claim 1, wherein the light-emitting surface is an inclined plane or a cambered plane.

7. The light guide element of claim 1, wherein the first reflecting surface is parallel to a central line of the light guide element, and the second reflecting surface is inclined to the central line.

8. The light guide element of claim 1, wherein the second reflecting surface is parallel to a central line of the light guide element, and the first reflecting surface is inclined to the central line.

9. The light guide element of claim 1, wherein the first reflecting surface and the second reflecting surface are inclined to a central line of the light guide element.

10. A lamp, comprising:
    a light guide element, wherein the light guide element has a length and an angle of total reflection, wherein the light guide element comprises:
    a light-incident surface having a first outer peripheral edge and a first inner peripheral edge, there is a distance between the first outer peripheral edge and the first inner peripheral edge;
    a light-emitting surface which is opposite to the light-incident surface, wherein an area of the light-emitting surface is greater than an area of the light-incident surface, wherein the light-emitting surface includes a second outer peripheral edge and a second inner peripheral edge;
    a first reflecting surface connecting the first outer peripheral edge and the second outer peripheral edge; and
    a second reflecting surface connecting the first inner peripheral edge and the second inner peripheral edge, wherein an angle is formed between an extension line of the first reflecting surface and an extension line of the second reflecting surface; and
    a light source, wherein a light generated from the light source enters the light guide element from the light-incident surface and emits out of the light-emitting surface to generate a predetermined light beam angle of the light, wherein a horizontal distance between the light source and the first outer peripheral edge is a predetermined distance, wherein the predetermined distance is determined a distance between the first outer perioheral edge of the light-incident surface and where the at least one light beam enters the light guide element;
    wherein the angle is smaller than the angle of total reflection, and the length of the light guide element is greater than the predetermined distance divided by tangent of the angle of total reflection; and
    whrerein the second reflecting surface extends from the first inner peripheral edge of the light-incident surface to the second inner peripheral edge of the light-emitting surface inwardly.

11. The lamp of claim 10, wherein the predetermined distance is half the distance between the first outer peripheral edge and the first inner peripheral edge.

12. The lamp of claim 10, wherein the light guide element is a polymethyl methacrylate light guide element, wherein the angle of total reflection is 42.16 degrees.

13. The lamp of claim 10, wherein the light guide element is a polycarbonate light guide element, wherein the angle of total reflection is 38.97 degrees.

14. The lamp of claim 10, wherein the light-emitting surface is a rough surface, a matte surface or a mesh surface.

15. The lamp of claim 10, wherein the light-emitting surface is an inclined plane or a cambered plane.

16. The lamp of claim 10, wherein the first reflecting surface is parallel to a central line of the light guide element, and the second reflecting surface is inclined to the central line.

17. The lamp of claim 10, wherein the second reflecting surface is parallel to a central line of the light guide element, and the first reflecting surface is inclined to the central line.

18. The lamp of claim 10, wherein the first reflecting surface and the second reflecting surface are inclined to a central line of the light guide element.

\* \* \* \* \*